(12) United States Patent
Mathiowetz

(10) Patent No.: US 8,581,450 B2
(45) Date of Patent: Nov. 12, 2013

(54) ELECTRICAL POWER TRANSFER PLUG AND CONNECTION SYSTEM

(75) Inventor: Michael Leonard Mathiowetz, Minntonka, MN (US)

(73) Assignee: Renewable Energy Technology Group (RETG), Snoqualmie, WA (US)

( * ) Notice: Subject to any disclaimer, the term of this patent is extended or adjusted under 35 U.S.C. 154(b) by 849 days.

(21) Appl. No.: 12/781,765

(22) Filed: May 17, 2010

(65) Prior Publication Data

US 2011/0278939 A1    Nov. 17, 2011

(51) Int. Cl.
*H01B 7/30* (2006.01)
(52) U.S. Cl.
USPC ........... 307/147; 361/668; 361/669; 361/670; 361/671; 439/781; 439/791; 439/517; 439/466; 439/881; 307/85
(58) Field of Classification Search
USPC ............. 307/85, 147; 361/668–671; 439/781, 439/791, 517, 466, 881
See application file for complete search history.

(56) References Cited

U.S. PATENT DOCUMENTS

| | | | |
|---|---|---|---|
| 6,365,990 B2 * | 4/2002 | Flegel | 307/64 |
| 6,376,937 B1 * | 4/2002 | Stewart | 307/125 |
| 7,390,224 B2 * | 6/2008 | Sodemann et al. | 439/638 |

* cited by examiner

*Primary Examiner* — Jared Fureman
*Assistant Examiner* — Alfonso Perez Borroto

(57) ABSTRACT

A system and method that offers the provision too rapidly and safely connect electrical generation sources, including inverters used by solar collecting panels, or wind turbines, and backup hydrocarbon fueled generators or any other supplemental power sources including storage batteries, fuel cells and future electric automobiles. Thus enabling the feeding of power to all circuits in the home or small business, not just isolated circuits in a structure. The system is compliant with electric codes, requires no costly rewiring inside the structure or in the electrical circuit panel and can be accomplished entirely from the outside of the home or small business adjacent to the electric service meter for the home or small business structure. It offers owners, utilities and equipment manufacturers a simple, safe, cost effective method for interconnection of renewable generation and storage devices with the electric grid for participation in smart energy management and net metering initiatives with local utility companies.

1 Claim, 5 Drawing Sheets

ELECTRICAL POWER TRANSFER PLUG AND CONNECTION SYSTEM

FIELD OF THE INVENTION

The present invention relates to the provision to rapidly and safely connect a grid-tied inverter/controller for solar collectors, wind turbine generators, back-up generators or any other supplemental power source or energy system that could be used to power a home or small business structure, thus enabling the feeding of power to all circuits, not just isolated circuits in a structure. The system is compliant with electric codes, requires no costly rewiring inside the structure or in the electrical circuit panel serving the structure and more particularly, it offers owners, utilities and equipment manufacturers a simple, safe, cost effective method for interconnection of renewable generation and storage devices with the electric grid for participation in smart and net meter initiatives with local utility companies.

BACKGROUND OF THE INVENTION

Traditionally, electric utilities have supplied home owners and businesses with electric energy. As demand for electric power increases so has the environmental awareness of the pollutants that are created in generating electricity to meet the growing demand.

While there are many efforts to develop renewable sources of electric energy all across the United States, most of these commercial scale efforts are still confronted with the same complexities as developing traditional centralized generation facilities such as coal or nuclear power plants.

The biggest issue facing any type of new centralized generation is how to transmit the generated electricity to the customer who is using it? Today in the US, almost all of the large capacity electric transmission lines are operating at their maximum safe capacity and in many cases existing transmission lines are old and need to be replaced. This situation with transmission lines puts utility companies in an increasingly difficult situation for continuing to meet the increasing demand for electrical energy.

The lack of transmission capacity, expanding environmental and regulatory requirements and political pressure is driving utilities to look and consider a multitude of new innovative ideas that have never before been considered to try and meet the ever increasing demand for electric energy. One of these is the concept of Micro Distributed Renewable Generation. Simply put, this means locating renewable forms of electric energy generation at the point where the energy is being used instead of transmitting the energy long distances from a centralized point of generation.

The concept of Micro Distributed Renewable Generation is attracting not only utilities as owner operators, but also the attention of an increasing number of home and small business owners. Micro Distributed Renewable Generation systems use a device called an inverter that conditions the generated electricity into a form of electricity useable by the electric appliances (AC alternating current) in a home or small business.

A Micro Distributed Renewable Generation system can be operated as a grid connected inverter or standalone, often referred to as a grid-tied or off grid respectively. The primary benefit of grid-tied operation is that any generated energy that is not consumed in the home or business can be routed back to the utility company and serve to in affect spin the owner's electric power meter backwards reducing the amount of purchased electricity from the utility company (net metering). For utilities, as owner operators, of the Micro Distributed Renewable Generation grid-tied systems it becomes an energy resource like any other generation asset.

As more manufacturers introduce solar and wind powered generation systems the cost of these systems are becoming more and more affordable. What has not been addressed and is not becoming more affordable is the labor costs associated with installing Micro Distributed Renewable Generation systems with grid-tied inverters. The average cost to install a fully integrated system large enough to power an average 1000 square foot home or small business is in the order of $ 5,000 or more. Most of this cost is the time consuming wiring involved with connection of the grid-tied inverter to the circuit breaker panel and the generation devices.

While new construction offers simplified access for wiring, the labor is still significant. Existing structures interject a multitude of complexities that all add labor costs to the installation. This includes coordination with owners for access, drilling holes in walls, pulling electric cables through hard to reach places, clean up and finishing work to restore the interior décor of the home or small business.

For there to be a widely adopted Micro Distributed Renewable Generation system using a grid-tied inverter, there is a need for an installation and connection system that will be simple, safe, intuitive, and an easily deployed process. The system will need to offer value to the home and small business owner, utility companies and installers.

It is this system and method of installing Micro Distributed Renewable Generation and grid tied inverters that are within this present invention.

SUMMARY OF THE INVENTION

In accordance with the present invention, there is provided a system and method that offers the provision to rapidly and safely connect inverters and generation devices such as solar collecting panels, wind turbines, backup hydrocarbon fueled generators or any other supplemental power sources such as fuel cells storage batteries and future electric automobiles. Thus enabling feeding power to all circuits in the home or small business, not just isolated circuits in a structure. The system is compliant with electric codes, requires no costly rewiring inside the structure or in the electrical circuit panel of the structure. It offers owners, utilities and equipment manufacturers a simple, safe, cost effective method for interconnection of renewable generation and storage devices with the electric grid for participation in smart energy management and net meter initiatives with utility companies.

It would be advantageous to provide a system and methods that offer the provision to rapidly, safely, and cost effectively connect renewable and alternative energy systems to a home or small business structure.

It would also be advantageous to provide a system and method that would supply electricity to the whole house or small business, not to just a few circuits in the electrical panel.

It would further be advantageous to provide a system that is non-intrusive, non-destructive and would allow the installer to connect a renewable alternative energy system entirely from outside the structure without the need to enter the house or small business.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
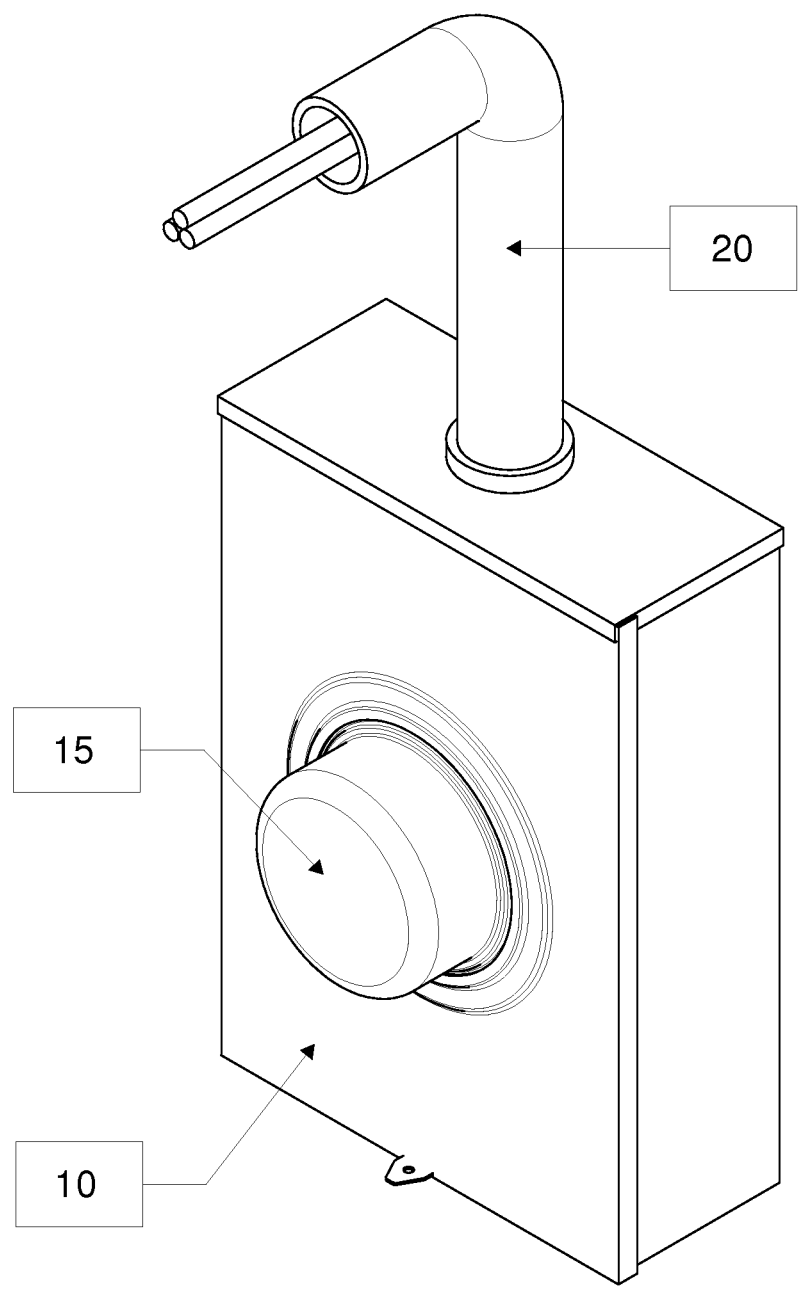
FIG. 1 is a perspective view of an of an existing meter junction box and standard meter with mast and power wires, used on most residential and small commercial buildings. This is considered a typical installation on most homes and small commercial buildings in the United States.

FIG. 1 is a perspective view of an existing meter socket box 10 and standard meter 15 with mast and power wires 20, used on most residential and small commercial buildings. This is considered a typical installation on most homes and small commercial buildings in the United States. This embodiment includes a mast and power wires 20 coming from the electric utility; this mast and power wires 20 is attached to a existing meter socket box 10 through the mast and power wires 20 that is serviced from overhead or underground by the utility company. The standard meter 15 is plugged into the existing meter socket box 10 thus completing the connection so the electricity from the mast and power wire can then feed through the standard meter 15 on into the main power service panel.

Figure 2:
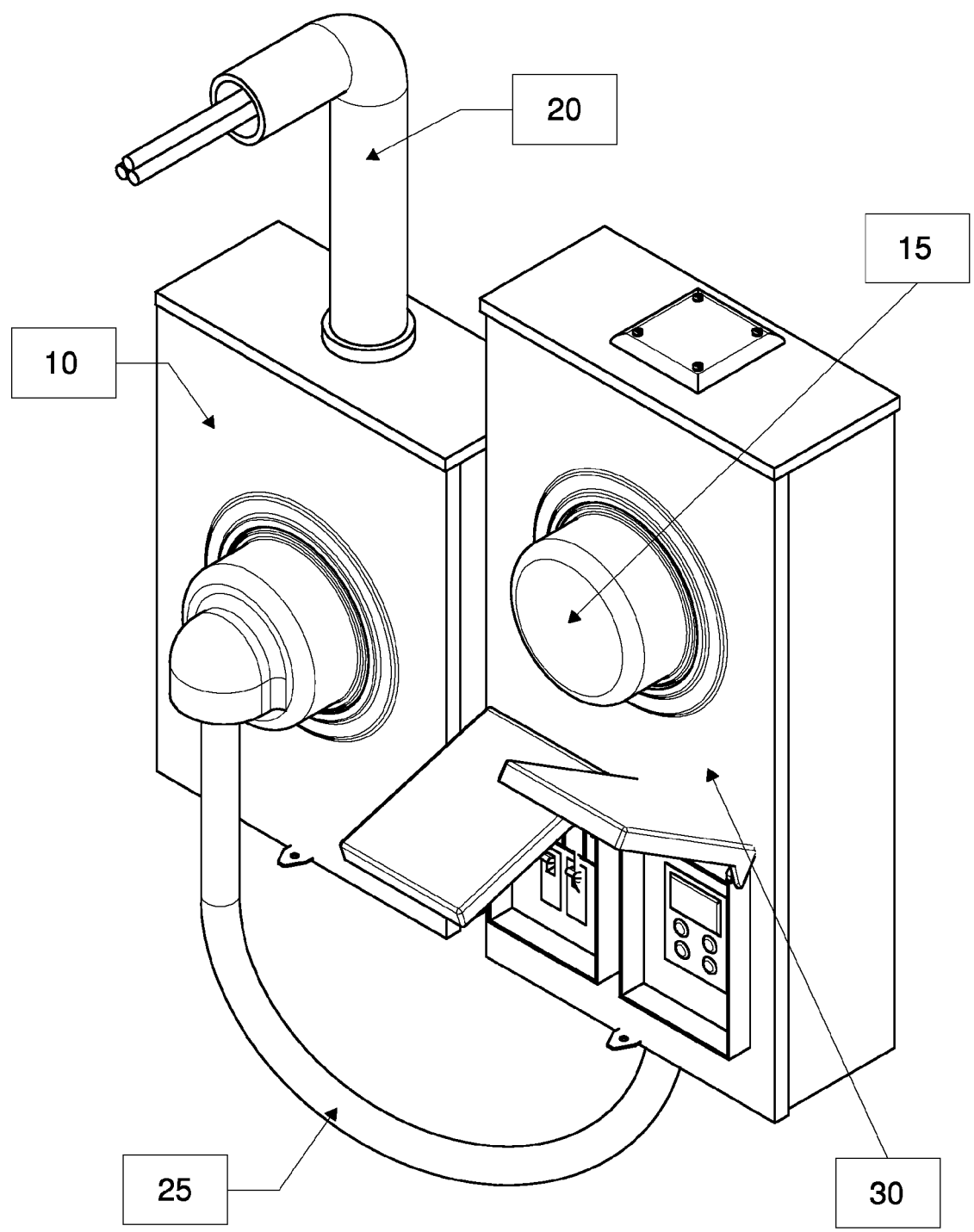
FIG. 2 is a perspective view of a typical meter junction box used on most residential and small commercial buildings with mast and power wires with the standard meter removed and replaced buy the power transfer plug. The electricity can now flow thru the power transfer plug into and out of the auxiliary meter socket and system junction box. The existing electric meter is relocated to the auxiliary meter socket and junction box.

FIG. 2 is a perspective view of the system installed showing the power transfer plug 52 in place and the system wire harness 25 transferring the power to the auxiliary meter socket and junction box 30. The primary goal of the present invention was to provide a quick, safe and cost efficient method to install a grid-tied renewable and or alternative energy system to the exterior of the building without any need to enter the home or small business and in turn reduce the cost of that installation. To that goal the power transfer plug 52 was invented, detailed descriptions are discussed in FIGS. 5, 6 and 7. This power transfer plug 52 is installed in the existing meter socket box 10 replacing the standard meter 15, intern rerouting the power through the system wire harness 25 to the new auxiliary meter socket and junction box 30.

Figure 3:
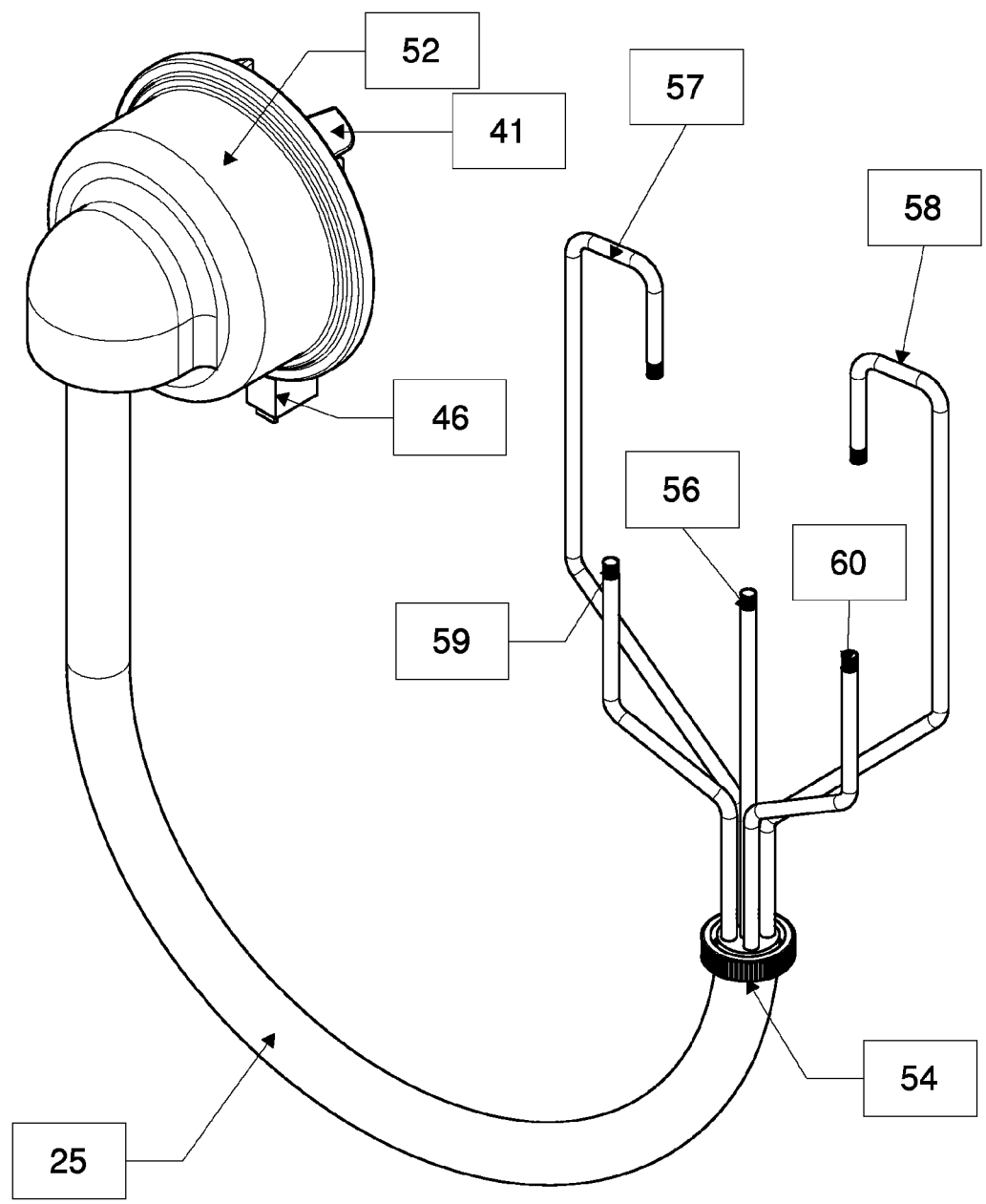
FIG. 3 is a perspective view of a complete power transfer plug showing the power transfer plug with the system wire harness connected. This view is what a system would look like coming from the manufacturer right out of the box.

FIG. 3 is a perspective view of the power transfer plug 52 as it would come from the manufacturer out of the box. In this view you can see the alignment guide blocks 41 that aid in guiding the power transfer plug 52 into the existing meter junction box 10. This is an added safety feature to help prevent any touching of the live wires in the existing meter junction box 10. Also seen on the power transfer plug 52 is the common wire block 46, this is where the common wire 56 is attached to the power transfer plug 52 the remaining wires are connected to power blade & block 50 that will be discussed in FIGS. 4 and 5. All these wire are run through a custom 200 amp system wire harness 25 that also includes provisions for the ground wire. The system wire harness 25 is securely attached to the auxiliary meter socket and junction box 30 with a wire harness connector 54. Next feature to this embodiment is the power transfer plug 52 wires showing the common wire 56, power leg one wire in 57 and power leg two wires in 58. It is through these wires that the power is transferred into the auxiliary meter socket and junction box 30. The next set of wires power leg one wire out 59 and power leg two wire out 60 transfer the power from the auxiliary meter socket and junction box 30 back to the existing meter socket box 10 and thus on into the main circuit panel of the home or small business structure.

Figure 4:
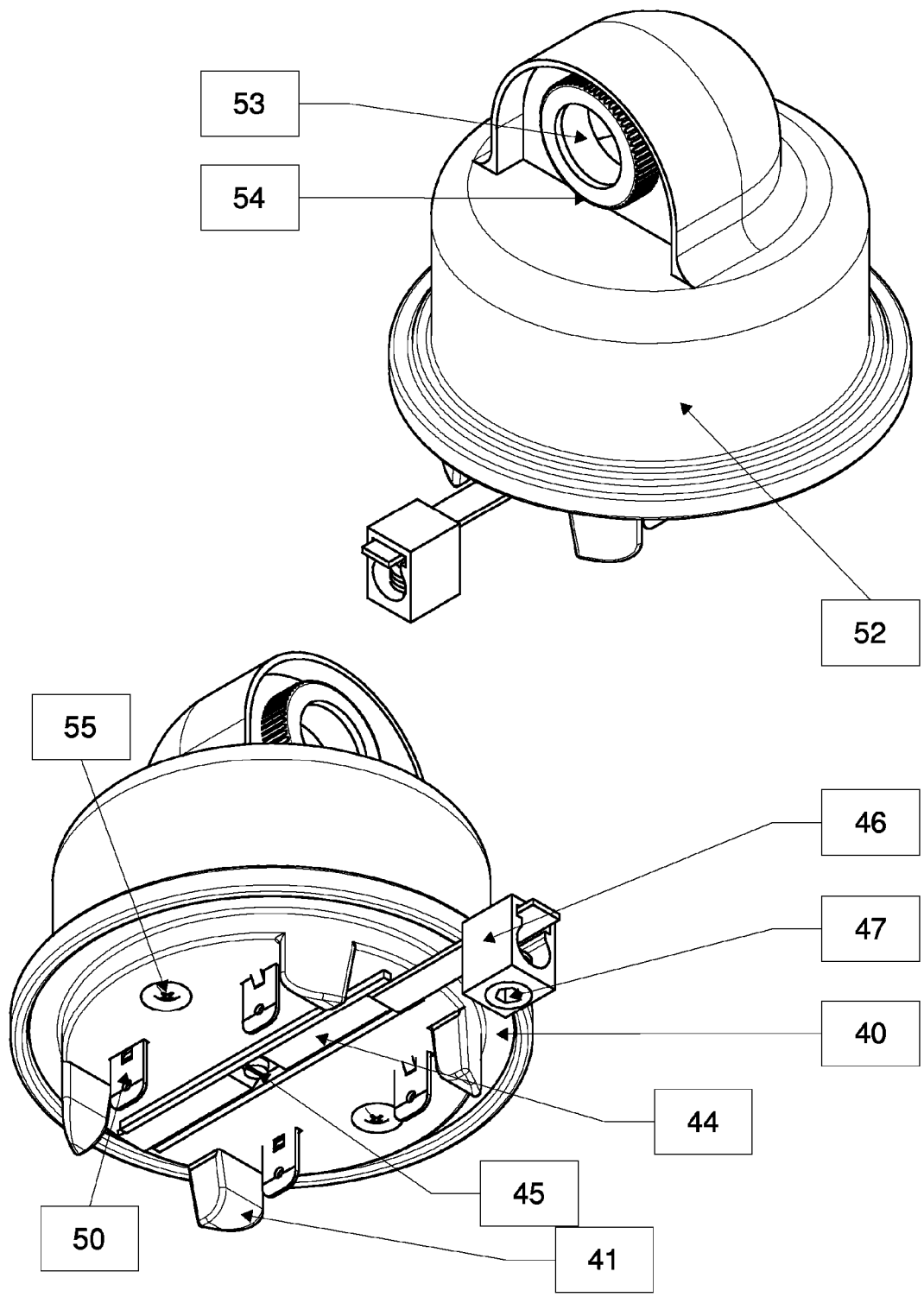
FIG. 4 is a perspective view of a power transfer plug, showing both the top and bottom of an assembled plug without the system wire harness.

FIG. 4 is a perspective view of the power transfer plug 52, a key element of the present invention. The power transfer plug 52 is the key element of the present invention that makes it fast and simple to install a renewable and or alternative energy system to a home or small business. The power transfer plug 52 comprises a power transfer plug base 40 of similar size to the standard meter 15, the power transfer plug base 40 is made from injection molded non-conductive plastic with alignment guide blocks 41 molded in the base for quick and safe plug in. There is a non-conductive plastic injection molded power transfer plug cover 53 of similar size and shape of the standard meter 15 that is held in place with cover screw 55. On the power transfer plug cover 53 the system wire harness 25 is held in place with wire harness connector 54. From this view you can clearly see the power blade & block 50, this knife looking blades fit into the existing meter junction box 10 to make the connections for the electrical power to flow through the system.

Figure 5:
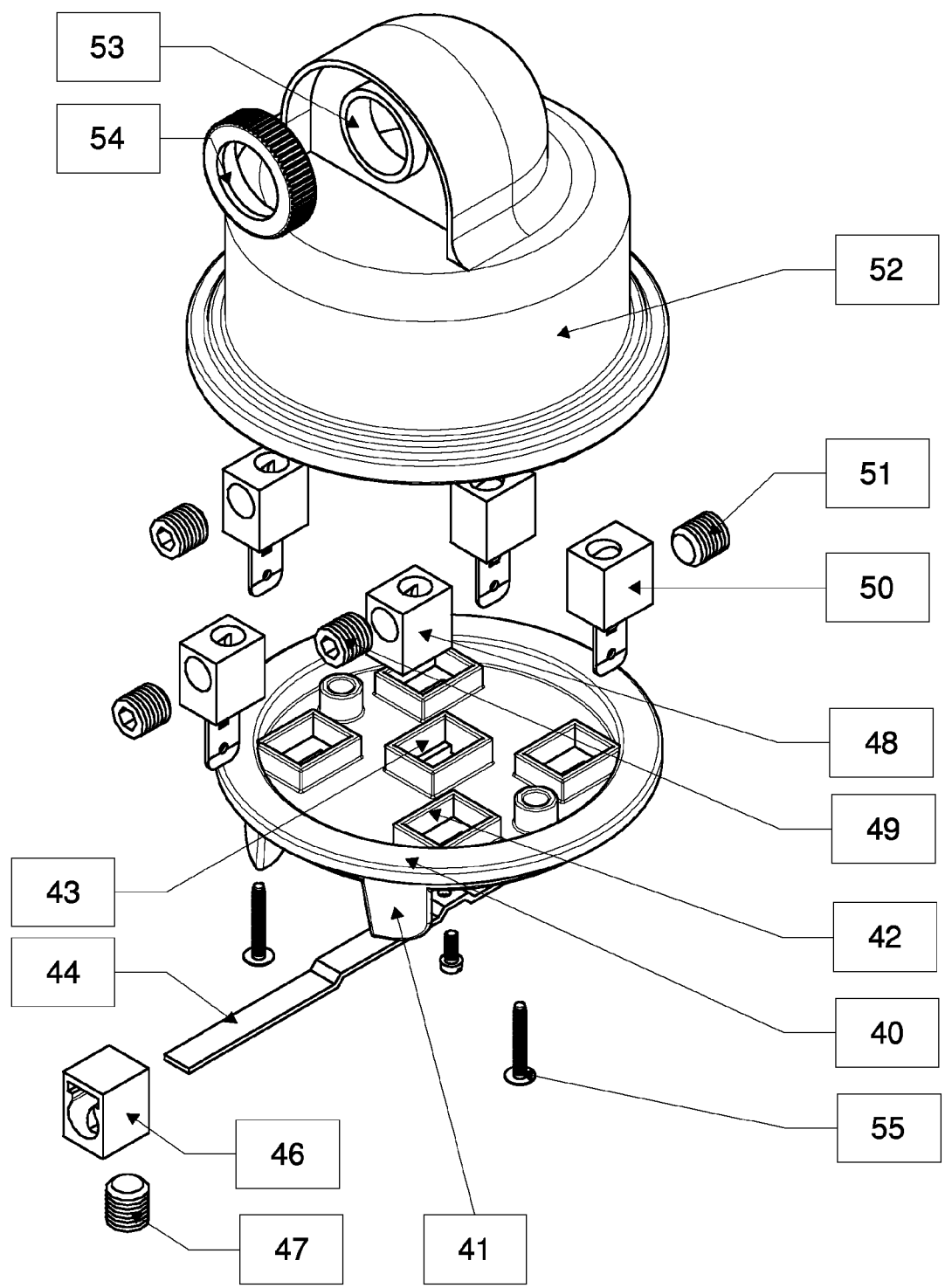
FIG. 5 is an exploded view of a power transfer plug, showing all the interior components that make up the power transfer plug portion of the system.

FIG. 5 is an exploded view of the power transfer plug 52. This view shows the interior parts of the power transfer plug 52. Molded in the power transfer plug base 40 is power blain & block seat 42 and common block seat 43, these securely hold the power blade & block 50 and the common block 48 in place and adds a margin of insulation between the blocks. The wires are then held tightly in place with the power blade & block screw 51. Furthermore, molded in the power transfer plug base 40 are locator strips for the common transfer strap 44. The common transfer strap 44 is held in place with the common strap screw 45 that is taped into the common block 48. On the end of the common transfer strap 44 is the common block clamp 47 with common block screw 49, this is used to attach the common wire 56 to the standard meter 15 receiver box. The power transfer plug cover 53 is lock to the power transfer plug base 40 with the cover screw 55 and the system wire harness 25 is then connected with the wire harness connector 54.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electrical power transfer plug and connection system for lowering a cost of installation of a grid-tied inverter/controller for solar collectors, wind turbine generators, back-up generators or any other supplemental power source or energy system that could be used to power your home or small business, comprising:

1.1 a 200 amp #2 gage copper wires, all weather flexible conduit system wire harness, for transferring electricity flow to and from an existing meter junction box into an auxiliary meter junction box and then back again to a house service panel through the existing meter junction box;

1.2 a plug that plugs into an existing meter socket, transfers power from existing meter junction box through the wire harness to auxiliary meter junction box, for diverting the electrical power from existing service to a new auxiliary meter junction box and load management center with inputs for alternative energy systems;

1.3 a common line common wire, for transferring power, rigidly connected to said system wire harness;

1.4 a #2 copper wire power leg one wire in, for power coming from a power utility through the power transfer plug into the auxiliary meter junction box from power leg one, rigidly connected to said system wire harness;

1.5 a #2 copper wire power leg two wire in, for power coming from the power utility through the power transfer plug into the auxiliary meter junction box from power leg two, rigidly connected to said system wire harness;

1.6 a #2 copper power leg one wire out, for return the power back of leg one to the existing meter junction box and on into a main service panel, rigidly connected to said system wire harness;

1.7 a #2 copper wire power leg two wire out, for return the power of leg two back to the existing meter junction box and on into the main service panel, rigidly connected to said system wire harness;

1.8 a non-conductive plastic injected molded part with alignment guide blocks, for guiding a meter jumper plug into correct alignment during an installation;

1.9 a copper cast part with zinc plating for a common wire block, for clamping the common wire from the meter junction box to a common transfer strap for facilitating transferring the common wire from the meter junction box to the auxiliary meter junction box and load management center;

1.10 a copper strap that is zinc coated, common transfer strap, for facilitating transferring the common wire from a meter receiver box to the auxiliary meter junction box and load management center, rigidly connected to said common wire block;

1.11 a copper screw that is zinc coated common strap screw, for connecting the common transfer strap to the common block for facilitating transferring the common wire from the existing meter junction box to the auxiliary meter junction box and load management center;

1.12 a copper zinc plated common block clamp, for clamping a ground wire from the meter receiver box to a ground transfer strap for facilitating transferring the ground wire from the meter receiver box to a system meter socket;

1.13 a non-conductive plastic injection molded power transfer plug base, for creating a base for which all other elements of a meter jumper plug are mounted too, rigidly connected to said common transfer strap, and rigidly connected to said alignment guide blocks;

1.14 a cast copper, zinc coated power blade & block, for facilitating within the meter transfer plug in transferring the electric current to and from the meter junction box and to and from the auxiliary meter junction box and load management center;

1.15 a zinc coated metal cover screw, for securing a meter plug cover to the plug base;

1.16 a non-conducting plastic injection molded part power transfer plug cover, for creating a weather tight seal and cover over the components of the power transfer plug, rigidly connected to said base component with cover screw;

1.17 a copper, zinc coated power blade & block screw, for securing the wire in the power blade & block within the meter transfer plug, facilitating transferring the electric current to and from the meter junction box to and from the auxiliary meter junction box and load management center, rigidly connected to said power blade & block;

1.18 a copper, zinc coated common block, for creating a connection point within the meter transfer plug for a custom wire harness to facilitating transferring the common wire from the meter junction box to the auxiliary meter junction box and load management center, rigidly connected to said common strap screw;

1.19 a copper, zinc coated common block screw, for securing the connection point within the meter transfer plug for the custom wire harness to facilitating transferring the common wire from the meter junction box to the auxiliary meter junction box and load management center, rigidly connected to said power transfer plug cover, and rigidly connected to said common wire block;

1.20 a non-conductive plastic injection molded part, power blain & block seat, for creating a secure mounting position for the power blade & block elements, rigidly connected to said power transfer plug base, and rigidly connected to said common block clamp; and 1.21 a non-conductive plastic injection molded part common block seat, for creating a secure mounting position for a common block element, rigidly connected to said common block, and rigidly connected to said power transfer plug base.

* * * * *